April 13, 1937.  H. F. MORSE  2,077,181

SUPPORT

Filed July 7, 1936

Inventor:
Harold F. Morse,
by Harry E. Dunham
His Attorney.

Patented Apr. 13, 1937

2,077,181

UNITED STATES PATENT OFFICE 2,077,181

SUPPORT

Harold F. Morse, Southport, Conn., assignor to General Electric Company, a corporation of New York Application July 7, 1936, Serial No. 89,321

6 Claims. (Cl. 173—338)

My invention relates to supports and more particularly to a support for electric fans.

An object of my invention is to provide an improved support which is simple in construction, sturdy, and which will not become loosened due to vibration of the member by which it is carried.

Figure 1:
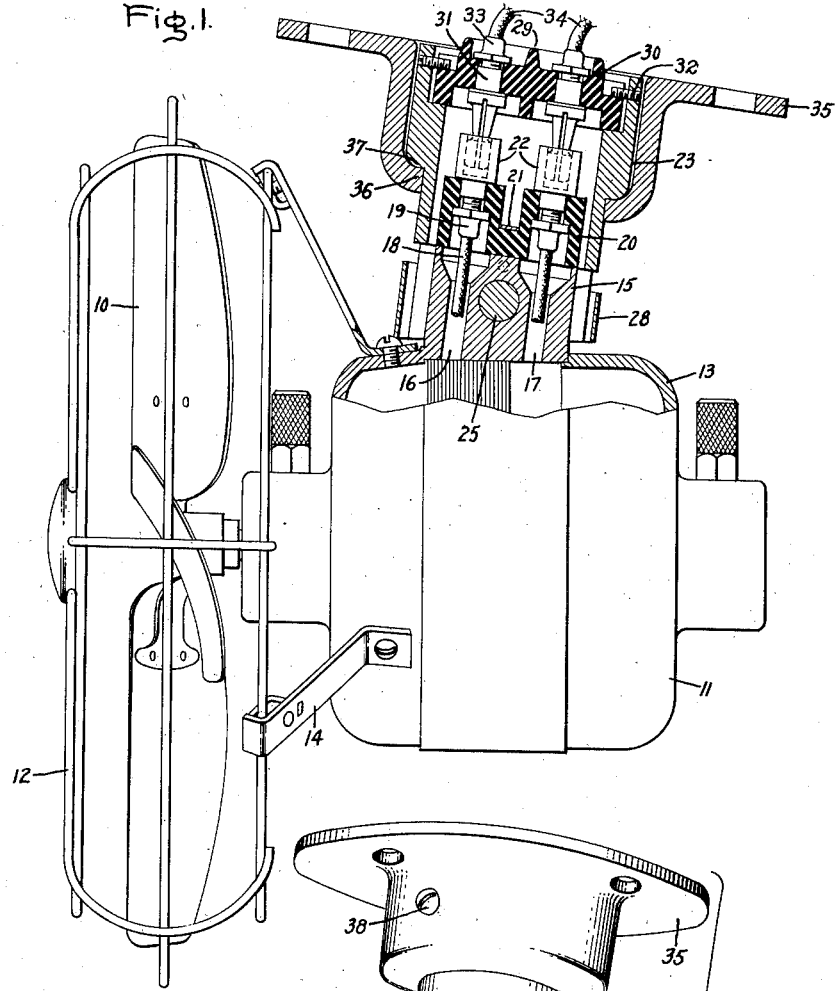
Figure 2:
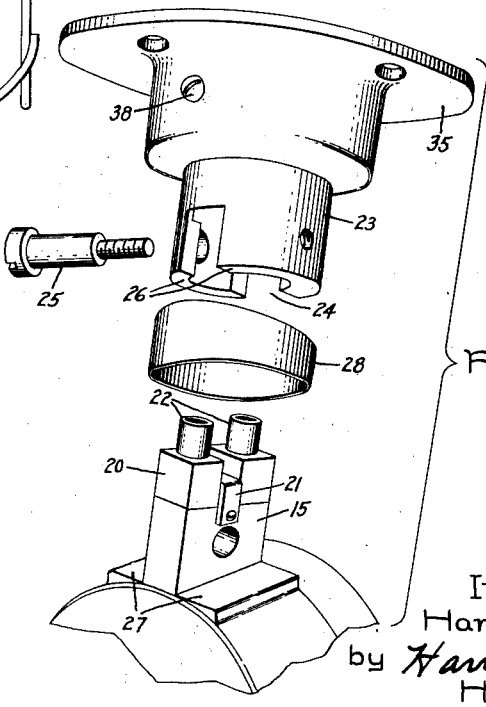

What I consider to be novel and my invention will be better understood by reference to the following specification and appended claims when considered in connection with the accompanying drawing in which Fig. 1 is a side view of a fan and my improved support with a portion partly in section, and Fig. 2 is an exploded perspective view of the support.

Referring to the drawing, 10 indicates a fan of the propeller type driven by an electric motor 11. Fan 10 is protected by a guard 12 which is supported on frame or casing 13 of motor 11 by means of arms 14. Integral with the motor casing 13 is a tang 15. Openings 16 and 17 are provided in tang 15 through which electrical leads 18 pass. Electrical leads 18 are provided with terminals 19 connected to their ends. Contacts 22 are supported in a member 20 of insulating material which is secured to tang 15 by means of a strap 21 and securely held therein by threaded engagement with terminals 19. A swivel link 23 is provided with a slot 24 in which the tang 15 is adapted to enter. To secure the swivel link 23 to the tang 15, a bolt 25 is provided which passes through tang 15 and is threaded into link 23. Swivel link 23 is ground at an angle to its axis so that its end surfaces 26 may engage flats 27 provided on the surface of motor casing 13 adjacent to tang 15. By this arrangement the motor and fan are supported at an angle to the horizontal. When fans are mounted on subway cars or similar vehicles there may be considerable vibration which may loosen the support and thus endanger the lives of passengers on the vehicle. To prevent the screw 25 from loosening due to such vibration, a retaining ring 28 is provided surrounding link 23 which is held by gravity over the center line of screw 25. Within the top of link 23 a plug member 29 comprising a body 30 of insulating material and two male contact members 31 is secured by means of set screws 32. Contact members 31 are secured in body 30 by threaded engagement with terminals 33 connected to leads 34. When the tang 15 is secured in link 23, a connection is completed between contacts 22 and male contact members 31 to complete the electrical circuit for the motor 11. A flange 35 is provided in which the link 23 may be located and secured to a wall or ceiling. An inturned edge 36 of flange 35 engages a shoulder 37 on link 23.

In assembly of the support the link 23 is first inserted in flange 35 from the top and secured against rotational movement by means of a screw 38. The flange 35 is then secured to the wall or ceiling. The ring 28 is then passed over the lower end of link 23 and held against the flange 35. The motor and fan are then located in position with the tang 15 passing through opening 24 of link 23. The screw 25 is then passed through tang 15 and threaded into link 23 to secure the tang 15 to the link 23. When the screw 25 is threaded home the ring 28 may be released and the force of gravity will hold it over the center line of screw 25. After the assembly has been completed horizontal adjustment may be made by loosening screw 38 and turning the fan assembly to the desired position rotating link 23 within flange 35.

From the foregoing it may be seen that an improved support is provided of simple, rugged construction, which is insured against the loosening of the parts due to vibration to prevent the falling of the electric fan or other device carried thereby.

What I claim as new and desire to secure by Letters Patent of the United States is:

1. A support comprising a tang, a swivel link, a bolt passing through said tang and in threaded engagement with said link, a retaining ring located around said link adapted to prevent the loosening of said bolt, and a flange secured to said link.

2. A support comprising a tang, a swivel link having a transverse slot, a bolt passing through said tang and threaded into said link to secure the tang in said slot, a retaining ring located around said link adapted to prevent the loosening of said bolt, and a flange secured to said link and adapted to be fastened to a wall or ceiling.

3. A support for an electric fan comprising a tang secured to a motor casing, a swivel link having a transverse slot, a bolt securing said tang to the link in said slot, a retaining ring surrounding said link and said bolt to prevent the loosening of said bolt, and a flange secured to said link and adapted to be mounted on a wall or ceiling.

4. A support for an electric fan comprising a flange, a swivel link secured in said flange, electrical contacts located in said link, a tang secured to a motor casing, contacts carried by said tang engaging the contacts mounted in said link, a bolt securing said tang in the slot of said link, and a retaining ring surrounding the end of said link and said bolt whereby to prevent the loosening of said bolt upon vibration of the support.

5. A support for an electric fan comprising a flange having an inturned edge, a swivel link located in said flange and having a shoulder engaging the inturned edge, a tang secured to a motor frame and located in a slot in said link, interengaging electrical contacts carried by said link and said tang, a bolt passing through said tang and in threaded engagement with said link, and a retaining ring surrounding the lower end of said link and said bolt and adapted to prevent the loosening of the support by vibration.

6. A support for electric fans comprising a flange having an inturned edge, a swivel link located in said flange having a shoulder engaging said inturned edge, a tang secured to a motor frame and located in a slot in said link, flats adjacent said tang engaging the end surfaces of said link at an acute angle to the axis of the link, a bolt passing through said tang and in threaded engagement with said link, and a retaining ring located around the lower end of said link and adapted to prevent the loosening of said bolt upon vibration of the support.

HAROLD F. MORSE.